United States Patent [19]

Yamamoto

[11] Patent Number: 4,672,480

[45] Date of Patent: Jun. 9, 1987

[54] APPARATUS FOR RECORDING DIGITAL DATA OF VARIOUS KINDS ON A SLANT TRACK OF A RECORDING TAPE

[75] Inventor: Kaichi Yamamoto, Kanagawa, Japan

[73] Assignee: Sony Corporation, Tokyo, Japan

[21] Appl. No.: 669,857

[22] Filed: Nov. 9, 1984

[30] Foreign Application Priority Data

Nov. 16, 1983 [JP] Japan .................. 58-215800

[51] Int. Cl.⁴ .................. G11B 5/09
[52] U.S. Cl. .................. 360/32; 360/39
[58] Field of Search .................. 360/32, 39, 55, 8

[56] References Cited

U.S. PATENT DOCUMENTS

| | | | |
|---|---|---|---|
| 4,138,694 | 2/1979 | Doi et al. .................. | 360/32 X |
| 4,141,039 | 2/1979 | Yamamoto .................. | 360/8 X |
| 4,206,476 | 6/1980 | Hashimoto .................. | 360/8 X |
| 4,334,247 | 6/1982 | Lemke .................. | 360/36.1 X |
| 4,378,593 | 3/1983 | Yamamoto .................. | 364/900 |

FOREIGN PATENT DOCUMENTS

| | | | |
|---|---|---|---|
| 56-06415 | 1/1982 | Japan .................. | 360/39 |
| 1512379 | 6/1978 | United Kingdom . | |
| 1533671 | 11/1978 | United Kingdom . | |

OTHER PUBLICATIONS

Lee, Time Compression and Expansion of Speech by the Sampling Method; Journal of the Audio Engineering Society, May 4, 1972.

Primary Examiner—Raymond F. Cardillo
Assistant Examiner—Alyssa H. Bowler
Attorney, Agent, or Firm—Lewis H. Eslinger; Alvin Sinderbrand

[57] ABSTRACT

Digital data is recorded on a slant track of a magnetic tape by a rotary head, in which the sampling frequency of the digital data can be changed in accordance with the nature of the digital data. The recording apparatus comprises a memory for writing the digital data in response to an input clock signal which is synchronized with the sampling frequency and reading the digital data therefrom in response to a system clock signal; and a circuit for converting the digital data read out from the memory into a data block having such a capacity that the data block can be recorded during one scan of the rotary head. Even when the data rate of the input digital signal is unclear, if the data rate lies within a range where the buffer memory does not overflow, the apparatus can continuously record the input digital signal. Thus, the apparatus can easily interface with an external computer.

5 Claims, 18 Drawing Figures

Fig. 2
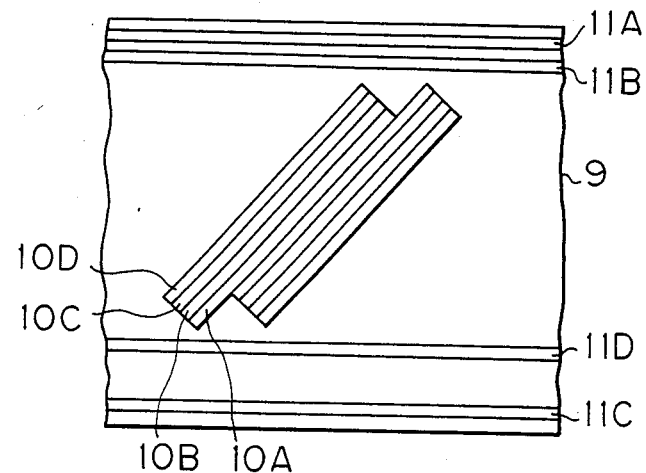
Fig. 3A
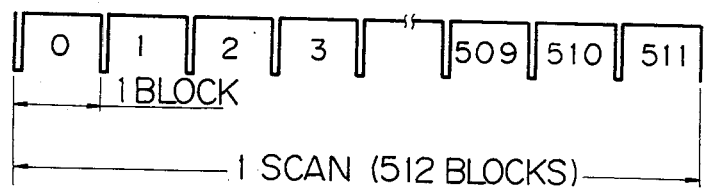
Fig. 3B
Fig. 3C
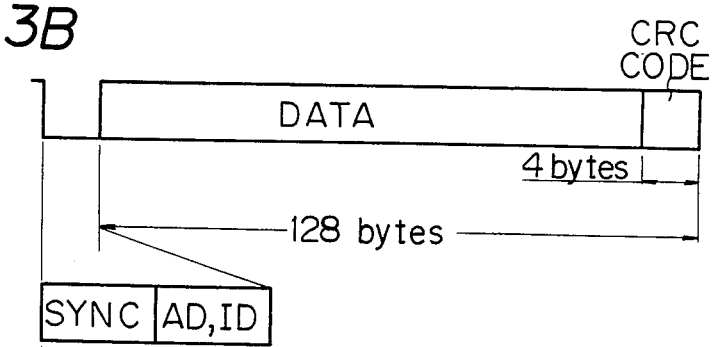

Fig. 8A RST
Fig. 8B CKWN
Fig. 8C RX
Fig. 8D CL
Fig. 8E DS

Fig. 9A DST
Fig. 9B CKSN
Fig. 9C CMP
Fig. 9D $\overline{RALD}$

APPARATUS FOR RECORDING DIGITAL DATA OF VARIOUS KINDS ON A SLANT TRACK OF A RECORDING TAPE

BACKGROUND OF THE INVENTION

1. Field of the Invention

The present invention relates to an apparatus for recording digital data which is applied to a digital data recorder for recording digital data on a magnetic tape by a rotary head.

2. Description of the Prior Art

As a data recorder for use in recording of measurement data, a recorder for recording such data on a magnetic tape along its longitudinal direction has been conventionally known. In case of performing the recording in the longitudinal direction, it is necessary to set the tape speed to be extremely high for attainment of high speed and high density recording. Therefore, a long time recording cannot, be made unless the tape reel is made unacceptably large. This problem does not arise in recording apparatus using a rotary head. However, in the case where the wrap angle of the magnetic tape around the guide drum lies within a range of 180° to 270°, a discontinuous point occurs at the head switching point. In the case where the wrap angle lies within a range of 270° to 360°, the rotary head parts from the magnetic tape, so that a discontinuous point occurs during the time when the rotary head again lands on the magnetic tape.

Therefore, it is necessary to perform the processing for this discontinuous point in order to record continuous data. In the case where the sampling frequency is distinctly determined such as an audio PCM signal, the time base compression on the basis of a predetermined ratio may be carried out. However, in the case where the sampling frequency of the input digital signal is obscure such as in a data recorder, the time base compression based on a predetermined ratio cannot be performed.

In addition, a conventional data recorder merely records and reproduces an external input and does not form a proper interface with an external computer. Therefore, it is impossible to supply a part of an input digital signal to a computer and analyze it, nor to supply graphic data from the computer to the data recorder and record it.

Thus, a method is considered whereby a buffer memory in which the recording data can be stored is provided and the data is transmitted and received between this buffer memory and the external computer. However, the data rates and data formats of the data from the computer and of the input digital signal to the data recorder do not coincide, so that if such two data and addresses are switched and written in the buffer memory, a problem will be caused since the constitution of the selector and the control for the selector become complicated.

OBJECT AND SUMMARY OF THE INVENTION

It is therefore an object of the present invention to provide apparatus for recording digital data using a rotary head which can record continuous input digital data whose sampling frequency is unclear without any trouble.

This object is accomplished by apparatus for recording digital data on a slant track of a recording medium by a rotary head, the sampling frequency of this digital data being able to be changed in accordance with the nature of the digital data, comprising: memory means for writing the digital data in response to an input clock signal which is synchronized with sampling frequency and reading the digital data therefrom in response to a system clock signal; and means for converting the digital data read out from the memory means into a data block having such a capacity that this data block can be recorded during one scan of the rotary head.

Another object of the invention is to provide apparatus for recording digital data which can easily form an interface with an external computer.

Still another object of the invention is to provide apparatus for recording digital data which can record the data which was digitized using a sampling frequency that was quite freely determined within a range which does not exceed the capability of the apparatus The above and other objects, features and advantages of the present invention will be more apparent from the following detailed description in conjunction with the accompanying drawings

BRIEF DESCRIPTION OF THE DRAWINGS

FIG. 2 is a schematic diagram showing a recording pattern formed on a recording tape in this embodiment;

FIGS. 3A-3C are schematic diagrams which are used for explaining a recording signal in this embodiment;

FIGS. 8A-8E are time charts which are used for explaining the data size detector; and FIGS. 9A-9D are time charts which are used for explaining the address control of a buffer memory on the recording side.

DETAILED DESCRIPTION OF THE PREFERRED EMBODIMENT

Figure 1:
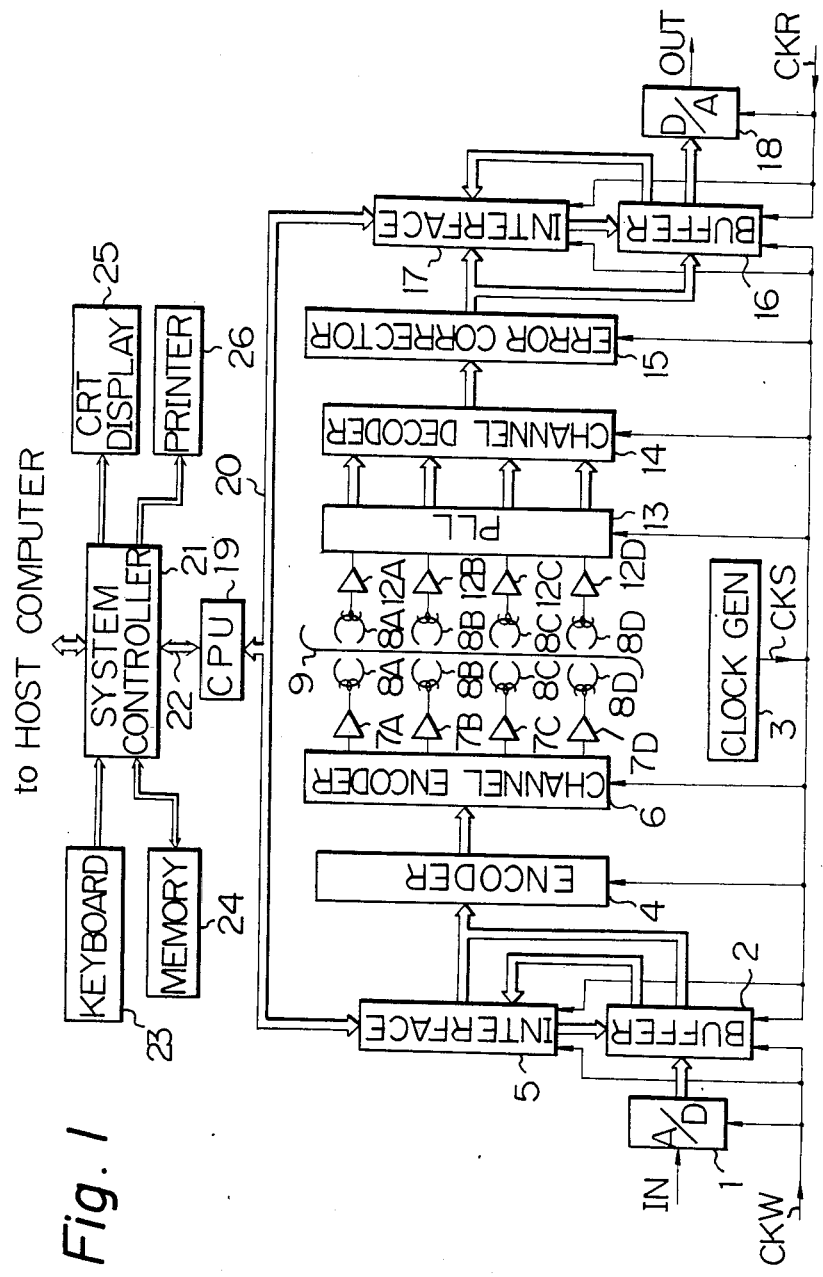
FIG. 1 is a block diagram showing an overall arrangement of one embodiment of the present invention.

The invention will now be described in detail hereinbelow with respect to one embodiment in the case where the invention was applied to a digital data recorder. FIG. 1 shows an overall arrangement of this embodiment, in which a reference numeral 1 denotes an A/D converter to which an analog data signal is supplied. An external clock CKW is supplied to the A/D converter 1, so that digital data in which one sample consists of, for example, eight bits is inputted from the A/D converter 1 to a buffer memory 2. The output data from the A/D converter 1 is written in the buffer memory 2 in response to the external clock CKW, while it is read out from the buffer memory 2 in response to a system clock CKS from a clock generator 3 provided in the data recorder. The external clock CKW is well managed and constituted with a high degree of accuracy so as not to drift because of a temperature change. The digital data read out from the buffer memory 2 is supplied to an encoder (namely, redundancy code generator) 4.

A numeral 5 indicates an interface. The interface 5 generates a control word upon recording and this control word is supplied to the encoder 4. An address controller to control the address of the buffer memory 2 is provided in the interface 5. The interface 5 also serves as a mediating apparatus to store data, for instance, graphic data from an external host computer into the buffer memory 2 irrespective of the recording operation or to supply the input digital data from the buffer memory 2 to the host computer.

The encoder 4, which is used for error correction coding, performs a shuffling to convert the sequence of the data to a sequence different from the original sequence using, as a unit, the length of one scan which is recorded during one scan of the rotary head, at the same time it performs the coding processing of the error correction codes with respect to the data of one scan which was subjected to this shuffling processing and generates a redundancy code. As the error correction codes, for instance, Reed Solomon codes can be used. The block address and identification data of the recording data are also formed by the encoder 4 and they are inserted for every block of the recording data.

The output data of the encoder 4 is supplied to an encoder 6. The encoder 6 performs the channel encoding of the recording data and the insertion of the block sync signal. The recording data divided into four-channel data are fetched as outputs of the encoder 6. As the channel encoding, for instance, it is possible to use the (8 to 9) conversion for converting one sample consisting of eight bits to one sample consisting of nine bits. The outputs in the respective channels of the encoder 6 are supplied to rotary heads 8A to 8D through recording amplifiers 7A to 7D and rotary transformers (not shown) and are recorded on a magnetic tape 9. The processing of the digital data read out from the buffer memory 2 or from the memory in the interface 5 is executed in response to the system clock CKS.

FIG. 2 shows a recording pattern on the magnetic tape 9 in this embodiment. The rotary heads 8A to 8D obliquely scan the magnetic tape 9 wrapped around the tape guide drum from the lower side to the upper side, so that four parallel tracks 10A to 10D are formed during one scan. Audio tracks 11A to 11C and a control track 11D are provided along the longitudinal direction of the magnetic tape 9. A sequence number as a track address is recorded on the audio track 11C. A signal for servo control is recorded on the control track 11D.

The data processing is performed using the data which is obtained during one scan as a unit. FIG. 3A shows the recording data in one scan which is outputted from the encoder 4. One scan includes 512 blocks consisting of the 0th to 511th blocks. Among the 512 blocks, 32 blocks are for a redundancy code; two blocks are for a control word; and 478 blocks are for digital data. The control word is constituted by one block consisting of the sequence number, data size signal indicative of the number of input data during the interval of one scan and user's code; the same block as this block is once more recorded to form two identical blocks. The recording data of 512 blocks are recorded on the four tracks by reducing the data rate to one-fourth. As shown in FIG. 3B, one block consists of 128 bytes including the 4-byte CRC code (which is a kind of cyclic code and is a redundancy code for error detection). As shown in FIG. 3C, a block sync signal SYNC of two bytes and a block address AD of two bytes and an identification signal ID are added to the head of each block by the encoder 6.

The signals reproduced from the magnetic tape 9 by the rotary heads 8A to 8D are supplied to PLL circuit 13 through rotary transformers (not shown) and reproducing amplifiers 12A to 12D, respectively. A clock is recovered from the reproduction data of each track by the PLL circuit 13. The output of the PLL circuit 13 is supplied to a decoder 14. The decoder 14 has a circuit for recovering the block sync signal, a TBC for eliminating the time base variation, a channel decoder, etc. The reproduction data which was returned to the one-channel data is derived as the output of the decoder 14. This reproduction data is supplied to an error correcting circuit 15.

The error correcting circuit 15 comprises a deshuffling circuit for returning the data arrangement to the original sequence and a correcting circuit to perform the error correction twice in the longitudinal and transverse directions, respectively. The reproduction digital data of which one-bit error flag was added to each sample is fetched as the output of the error correcting circuit 15 and is supplied to a buffer memory 16 and an interface 17. The error flag has a low level in the case of sample data of in which no error is detected or an error was corrected, while it has a high level in the case of the other sample data, that is, sample data including an error. Among the reproduction data, the valid sample data, namely, the data of which the error flag is at a low level, is written in the buffer memory 16 and in the memory of the interface 17. The digital data is written in the buffer memory 16. The control word is written in the memory of the interface 17.

These writing operations are executed in response to the system clock CKS from the clock generator 3. On the other hand, the reading operations of the data from the buffer memory 16 and from the memory of the interface 17 are performed in response to an external clock CKR. The interface 17 is provided with an address controller to control the address of the buffer memory 16. The reproduction digital data read out from the buffer memory 16 is supplied to a D/A converter 18 and is converted to the analog data and outputted in response to the external clock CKR. This external clock CKR is the same as the external clock CKW used upon recording and is the extremely stable clock signal which is well managed. The external clocks CKR and CKW ordinarily have frequencies lower than the frequency of the system clock CKS in order to prevent the occurrences of overflows in the buffer memories 2 and 16 when the data in one scan is processed.

The interface 17 serves as a mediating apparatus to fetch the control data upon reproduction and to supply the reproduction data of the sequence number which is coincident with the sequence number designated by the user to the host computer. A microprocessor (CPU) 19 is provided in the above-described processor and performs the data processings on the recording and reproducing sides. A data and address bus 20 connects the microprocessor 19 and the interfaces 5 and 17.

A numeral 21 denotes a system controller in the embodiment. A data and address bus 22 connects the system controller 21 and the microprocessor 19. Further, the system controller 21 is connected to a host computer (not shown). A microprocessor is included in the system controller 21. A keyboard 23, a memory 24 for data file, a CRT display 25, and, a printer 26 are connected to the system control 21. The system controller 21 performs the remote control of the rotary head type data recorder including the rotary heads 8A to 8D, magnetic tape 9 and the like, thereby controlling various operations of the data recorder. Further, the user's codes indicating year, month, day, time, kinds of data, etc., are produced due to the operation of the keyboard 23 by the user.

Figure 4:
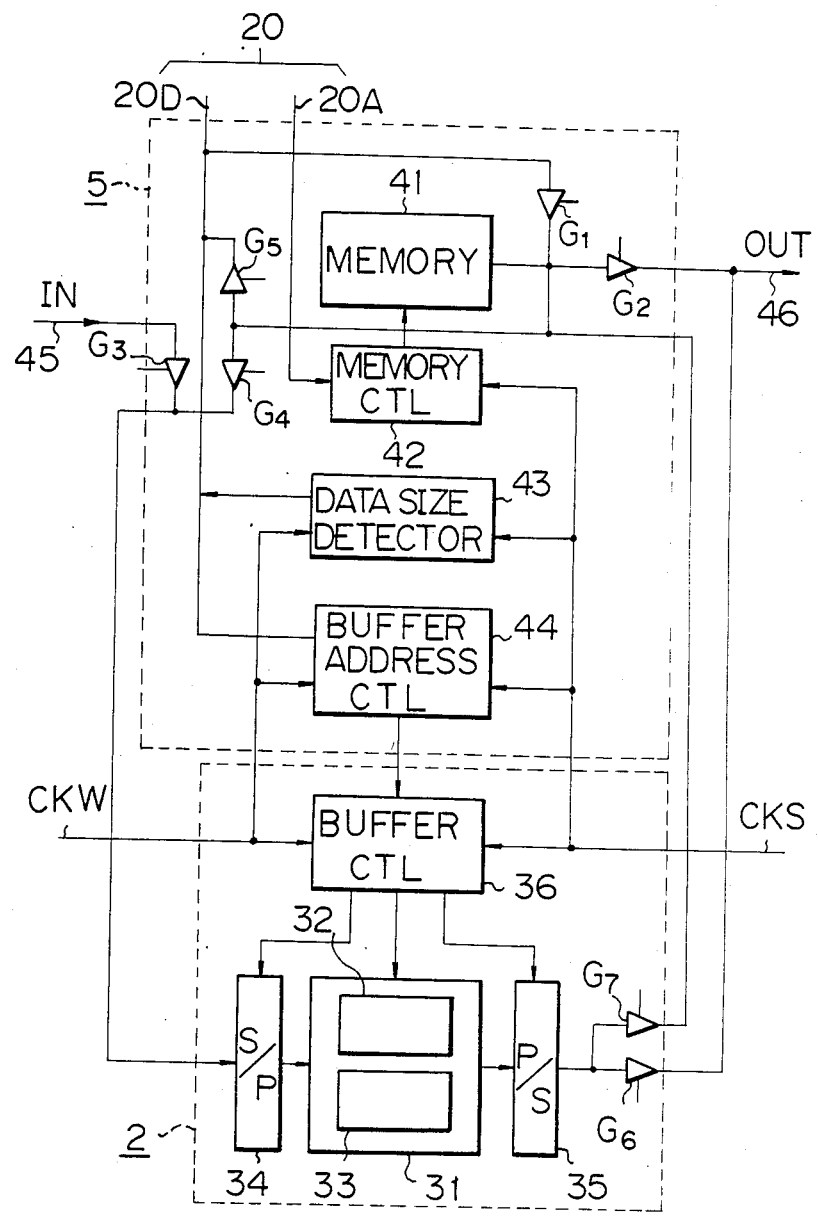
FIGS. 4 and 5 are a more detailed block diagram showing a partial arrangement on the recording side in this embodiment and a time chart which is used for explanation thereof.

FIG. 4 shows arrangements of the buffer memory 2 and interface 5 provided on the recording side. The buffer memory 2 comprises: a memory 31 having two memory banks 32 and 33; a series-parallel converter 34 and a parallel-series converter 35 which are respectively provided on the input and output sides of the memory 31; and a buffer controller 36 to which the external clock CKW and system clock CKS are supplied. The interface 5 comprises: a memory 41 having such a small capacity that, for example, the data of one block can be stored; a memory controller 42; a data size detector 43; and a buffer address controller 44. Numerals 20D and 20A represent a data bus and an address bus of the microprocessor 19. The address which is supplied from the microprocessor 19 through the address bus 20A is supplied to the memory controller 42.

Tri-state circuits $G_1$ to $G_7$ are provided with regard to the data bus 20D, an input terminal 45 of the recording digital signal and an output terminal 46 of the recording digital signal, respectively. The microprocessor 19 receives the commands from the system controller 21 and the tri-state circuits $G_1$ to $G_7$ are controlled in response to control signals from the microprocessor 19. When recording, one of the memory banks 32 and 33 of the memory 31 is set into the writing state and the other is simultaneously set into the readout state, while the writing and readout states of the memory banks 32 and 33 are switched for every scan. The input digital signal which is supplied from the input terminal 45 through the tri-state circuit $G_3$ and series-parallel converter 34 is written in one memory bank which is in the writing state, for instance, in the memory bank 32 in response to the external clock CKW. The digital signal which has already been written is read out from the memory bank 33 in response to the system clock CKS during the interval of one scan. The writing and reading operations in and from the memory 31 are executed, for example, on an eight-byte parallel unit basis.

Each of the memory banks 32 and 33 has such a capacity that the digital signal (478 blocks × 124 bytes as mentioned above) which can be recorded during the interval of one scan can be stored. When both frequencies of the external clock CKW and system clock CKS are equal, the digital signal is completely written in the memory bank 32 during the interval of one scan for prevention of occurrence of the blank area, and the digital signal is once read out from the other memory bank 33. In the case where the frequency of the external clock CKW is lower than that of the system clock CKS, the amount of digital signal which is written during the interval of one scan becomes little, so that this causes a blank area in the memory bank 32 where no digital signal is written.

The data size detector 43 detects in which address of the memory bank 32 (or 33) the digital signal is written during the interval of one scan. This detected end address, namely, the data size signal, is supplied to the microprocessor 19 through the data bus 20D. This data size signal is supplied from the microprocessor 19 to the buffer address controller 44 and is used for control when the digital signal is read out. Upon readout of the digital signal from the memory bank 32 (or 33), the readout address changes from the start address to the end address, then it returns to the start address and changes to the end address. This readout operation is performed during the interval of one scan. Therefore, in the case where there is a blank area in the memory bank 32 (or 33) during the interval of one scan, at least a part of digital signal is read out twice and recorded twice on the magnetic tape 9.

Figure 5:
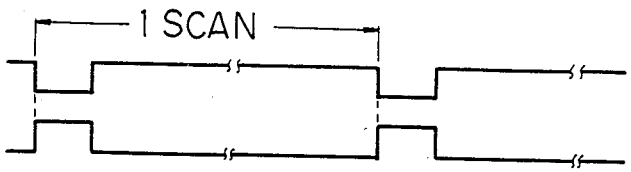

The digital signal read out from one memory bank of the memory 31 is returned to the byte-serial data by the parallel-series converter 35 and is fetched from the output terminal 46 through the tri-state circuit $G_6$. In addition, the control word such as the above-mentioned data size signal and serial number which are generated from the microprocessor 19, the user's codes formed in the system controller 21, etc., is supplied to the memory 41 through the data bus 20D and tri-state circuit $G_1$. The write address is supplied to the memory controller 42 through the address bus 20A. The control words are written in the memory 41 in response to the system clock CKS. The content of the memory 41 is read out twice during the intervals of the first and second blocks in the interval of one scan and is fetched from the output terminal 46 through the tri-state circuit $G_2$. As shown in FIG. 5, during the intervals of the first two blocks in the interval of one scan, the control signal regarding the tri-state circuit $G_2$ is set to a low level, the control signal regarding the tri-state circuit $G_6$ is set to a high level, and the tri-state circuit $G_2$ is made active. During the remaining interval in the interval of one scan, the control signals are reversed, so that the tri-state circuit $G_6$ is made active and the digital signal of which the two blocks of the control word and the 478 blocks of the digital signal are continuous is obtained from the output terminal 46.

Irrespective of the above-described recording operation, the digital signal can be written in the memory 31 of the buffer memory 2 from the external host computer through the microprocessor of the system controller 21 and through the microprocessor 19, and this digital signal can be recorded on the magnetic tape 9.

In this case, the data is transferred from the host computer to the microprocessor of the system controller 21. Then, the data is transferred to the microprocessor 19 using the data and address bus 22. The data is transferred from the microprocessor 19 to the memory 41 using the data bus 20D, tri-state circuit $G_1$ and address bus 20A. The data transfer from the memory 41 to the memory 31 is performed in response to the system clock CKS by making only the tri-state circuit $G_4$ active. The memory bank and address to which the data from the memory 41 is written are instructed to the buffer address controller 44 from the microprocessor 19.

The data in the memory 31 of the buffer memory 2 can be also supplied to the external host computer. In this case, the address corresponding to the block of the digital signal which should be supplied is supplied from the microprocessor 19 to the buffer address controller 44 through the data bus 20D. Only the tri-state circuit $G_7$ is made active, thereby allowing the digital signal of the one designated block to be transferred to the memory 41. Next, the digital signal read out from the memory 41 is supplied onto the data bus 20D through the tri-state circuit $G_5$ which is in the active state and is supplied to the microprocessor 19. The digital signal is transferred from the microprocessor 19 to the host computer through the microprocessor of the system controller 21.

Figure 6:
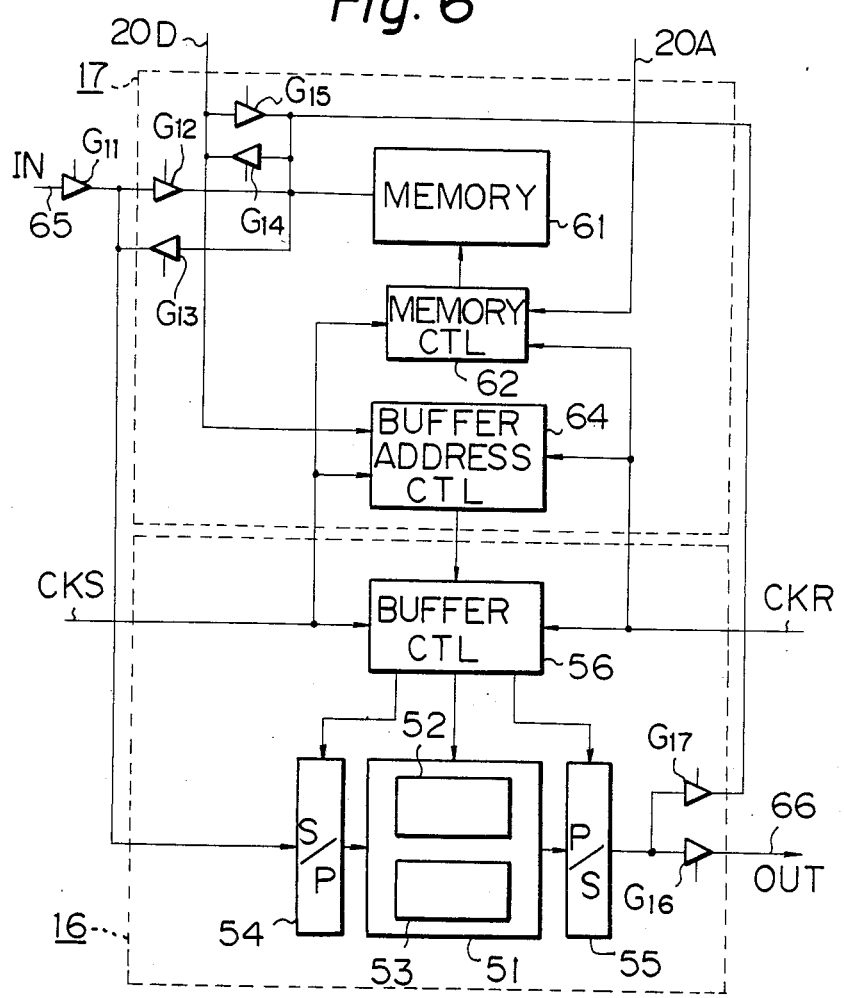
FIG. 6 is a more detailed block diagram showing a partial arrangement on the reproducing side in this embodiment.

FIG. 6 shows arrangement of the buffer memory 16 and interface 17 provided on the reproduction side. The buffer memory 16 comprises: a memory 51 having two memory banks 52 and 53; a series-parallel converter 54 and a parallel-series converter 55 which are respectively provided on the input and output sides of the memory 51; and a buffer controller 56. The interface 17 comprises: a memory 61 having such a capacity that the data of one block can be stored; a memory controller 62; and a buffer address controller 64. Tri-state circuits $G_{11}$ to $G_{17}$ are provided with regard to the data bus 20D, an input terminal 65 of the reproduction digital signal and an output terminal 66 of the reproduction digital signal, respectively. The reproduction digital signal uses, as a unit, nine bits of which a one-bit error flag was added to a one-byte data.

Upon reproducing operation, the tri-state circuits $G_{11}$ and $G_{16}$ are made active and during the intervals of the blocks of the control word, the tri-state circuit $G_{12}$ is made active. Among the control word and reproduction digital signal, only the valid data of which the error flags are at a low level, that is, only the data which were determined to be free of error are written in the memories 51 and 61. The same control word is recorded at least over two blocks and the digital signal is also recorded twice in the case where the frequency of the external clock CKW is lower than that of the system clock CKS. Therefore, the valid data can be reproduced owing to the error correction by the error correction codes as well.

The writing and readout states of the memory banks 52 and 53 of the memory 51 are switched for every interval of one scan. When the reproduction digital signal is supplied, the valid data in the control word of the first two blocks is written in the memory 61. The valid data in the reproduction digital signal included in the subsequent blocks is written in the one memory bank of the memory 51. The control word stored in the memory 61 is supplied to the microprocessor 19 through the tri-state circuit $G_{14}$ and data bus 20D. The end address during one scan which is determined by the data size signal in the control word is supplied from the microprocessor 19 to the buffer address controller 64. Thus, the reproduction digital signal which exists during one scan is correctly written in the one memory bank of the memory 51 and is read out in response to the external clock CKR during the interval of the next one scan. This digital signal is fetched from the output terminal 66 through the tri-state circuit $G_{16}$. The external clock CKR has the same frequency as that of the clock CKW. The continuous digital signal can be fetched from the output terminal 66.

The user can supply the digital signal of the serial number designated by the key operation through the keyboard 23 to the external host computer. When the serial number in the reproduced control word coincides with the designated serial number, the writing operation into the memory 51 is inhibited in response to a command from the microprocessor 19 and the content of the one memory bank is repeatedly read out. This digital signal which was read out is transferred one block at a time to the memory 61 through the tri-state circuit $G_{17}$. The data stored in the memory 61 is supplied to the microprocessor 19 through the tri-state circuit $G_{14}$ using the data bus 20D and address bus 20A of the microprocessor 19. The microprocessor 19 allows this supplied data to be transferred to the microprocessor of the system controller 21. Further, the microprocessor of the system controller 21 allows the data to be transferred to the host computer in accordance with the request.

The data from the host computer can be also written in the buffer memory 51. In this case, the tri-state circuit $G_{15}$ is made active, thereby permitting the data of one block to be transferred to the memory 61 using the data bus 20D and address bus 20A of the microprocessor 19 and allowing the write address to be supplied to the buffer address controller 64. Next, the tri-state circuit $G_{13}$ is made active and therefore transfers the content of the memory 61 to the memory 51.

Figure 7:
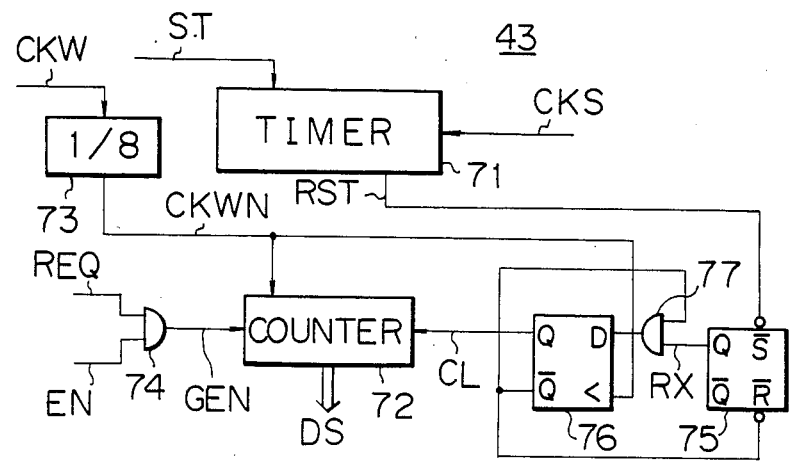
FIG. 7 is a block diagram showing an arrangement of an example of a data size detector which is provided on the recording side.
Figure 7:
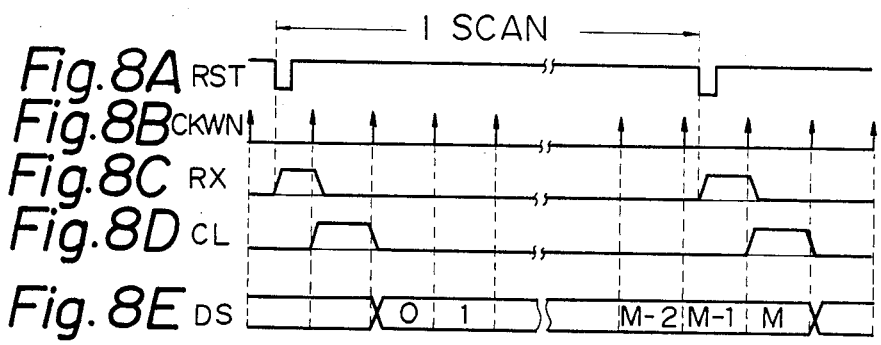

The data size detector 43 provided in the interface 5 on the recording side will now be described with reference to FIG. 7. The data size detector 43 comprises: a timer 71 for measuring the interval of one scan; a data size counter 72; a ⅛ frequency divider 73 for generating a clock input CKWN to the data size counter 72; an AND gate 74 for generating an enable signal GEN to the data size counter 72; and flip flops 75 and 76 and an AND gate 77 for generating a clear pulse CL to the data size counter 72.

In the embodiment, the frequency of the system clock CKS is set to be an integer times the rotational frequency of the rotary heads 8A to 8D. A start of measurement command signal ST and the system clock CKS are supplied to the timer 71. As shown in FIG. 8A, the timer 71 generates a timing signal RST which specifies the interval of one scan when the rotary heads 8A to 8D once scan on the magnetic tape 9.

In the embodiment, the two memory banks 32 and 33 of the memory 31 in the buffer memory 2 are constituted by two memory areas of one RAM. Eight samples are processed as the parallel data with respect to this RAM. The writing and reading operations of the data in and from each memory area in the RAM are executed in the interval of eight samples. Therefore, the input digital signal is detected on an eight-sample unit basis during the interval of one scan. A frequency divided clock CKWN shown in FIG. 8B which is the external clock CKW frequency divided into ⅛ is counted by the data size counter 72. A request signal REQ and an enable signal EN which are generated from the outside are supplied to the AND gate 74. The frequency divided clock CKWN is counted by the data size counter 72 during the interval when the enable signal GEN which is obtained as the output of the AND gate 74 is at a high level.

Since the phase of the timing signal RST to specify the interval of one scan does not coincide with the phase of the frequency divided clock CKWN, the clear pulse CL is formed by the flip flops 75 and 76. The timing signal RST is supplied to a set input of the flip flop 75. An output signal RX which assumes a high level in response to the trailing edge of the timing signal RST as shown in FIG. 8C is generated from the flip flop 75. This output signal RX is inputted as one input of the AND gate 77. The negative output of the flip flop 76 is supplied to the other input of the AND gate 77. An output of the AND gate 77 is inputted as the data input to the flip flop 76. The frequency divided clock CKWN is supplied as the clock input to the flip flop 76. The positive output of the flip flop 76 is used as the clear pulse CL. Further, when the negative output of the flip flop 76 assumes a low level, the flip flop 75 is reset.

When the positive output RX of the flip flop 75 assumes a high level, the positive output of the flip flop 76, namely, the clear pulse CL assumes a high level at a timing of the next frequency divided clock CKWN as shown in FIG. 8D. After the clear pulse CL assumes a high level, the data size counter 72 is cleared at a timing of the next frequency divided clock CKWN. At the same time, when the clear pulse CL assumes a high level, the flip flop 75 is reset and the output RX assumes a low level. Thus, the clear pulse CL assumes a low level at a timing of the next frequency divided clock CKWN and the clear of the data size counter 72 is cancelled. Therefore, the data size counter 72 counts the frequency divided clock CKWN during the interval from the trailing edge of the clear pulse CL until the next trailing edge. FIG. 8E shows an output DS of the data size counter 72. In this time chart, M data are detected during the interval of one scan. As described above, this output DS is supplied to the microprocessor 19 and is written in the memory 41 under control of the microprocessor 19.

The data size may be detected by counting the external clock CKW. In such a case, the timing signal RST may be used as the clear pulse to the data size counter 72.

As described above, during the interval of the next one scan after detecting the data size in the interval of one scan, the data is read out in response to the system clock CKS using this detected data size. In this readout operation, a measurement value M of the data size is stored in the register in the buffer address controller 44 by the microprocessor 19.

In addition to a write address counter and a read address counter, a comparator for comparing the measurement value M of the data size stored in the register with the output of the read address counter is provided in the buffer address controller 44. A timing signal DST is formed in the buffer address controller 44. This timing signal DST assumes a high level, as shown in FIG. 9A, during the time when the digital signal which can be recorded in the interval of one scan is read out from the memory 31. During the interval when the timing signal DST is at a high level, the output of the read address counter changes so as to be 0, 1, 2, ..., and M in response to the frequency divided system clock CKSN shown in FIG. 9B. When the output of the read address counter becomes M, it coincides with the measurement value M, so that an output CMP of the comparator assumes a high level as shown in FIG. 9C.

As shown in FIG. 9D, a load signal $\overline{RALD}$ of the read address counter is formed on the basis of the output CMP of the comparator and the timing signal DST. When this load signal $\overline{RALD}$ becomes a low level, the output of the read address counter is reset to 0. This operation is repeatedly performed during the interval when the timing signal DST is at a high level. Consequently, in the case where the data rate of the input digital signal is low and where only the data of, for instance, one-half of the capacity of the memory bank 32 or 33 is written, the change of the output of the read address counter from 0 to M is repeated twice. Namely, the same input digital signal is read out twice during the interval of one scan and recorded on the magnetic tape 9. In dependence upon the data rate of the input digital signal, there occurs a case where only a partial data is recorded twice or where the same data is recorded three or more times without being limited to two times.

Further, it is possible to easily detect from the data size signal (measurement value of the data size) that the data rate of the input digital signal is high and the amount of data which is supplied during the interval of one scan exceeds the amount of data which can be recorded during the interval of one scan. Thus, an alarm can be generated to the user.

The writing operation into the buffer memory 16 on the reproduction side is controlled in a similar manner as the control of the readout operation from the buffer memory 2 on the recording side. Namely, the write address counter of the buffer memory 2 may be controlled in response to the data size signal in the control word which is separated from the reproduction signal.

According to the invention, the continuous input digital signal can be recorded by the rotary heads without any trouble. In this invention, even when the data rate of the input digital signal is unclear, if the data rate lies within a range where the buffer memory does not overflow, the continuous recording can be performed. On the reproduction side, it is possible to store each data of one scan in the memory and to continuously read out the data from the memory by use of the data size signal. Therefore, the invention is effective in application to the rotary head type digital data recorder.

It is also possible to prepare a plurality of buffer memories which can continuously or intermittently store the reproduction data of different scans on the reproduction side and to selectively use these buffer memories.

Although the present invention has been shown and described with respect to a particular embodiment, various changes and modifications which are obvious to a person skilled in the art to which the invention pertains are deemed to lie within the spirit and scope of the invention.

What is claimed is:

1. Apparatus for recording digital data of various kinds on a slant track of a recording medium by means of a rotary head, said digital data being sampled at a sampling frequency that is adjustable in accordance with the nature of said digital data; said apparatus comprising:
    means for generating a system clock signal;
    means for generating an input clock signal which is synchronized with said sampling frequency;
    memory means for writing said digital data in response to said input clock signal and reading said digital data therefrom in response to said system clock signal; and
    means for converting said digital data read out from said memory means into a data block in which said data is repeated as necessary so wherein said memory means further comprises means for generating a read address and a write address and means for detecting an amount of digital data which is stored in said memory means during one scan of said rotary head, and said generating means cyclically generates the read address to said memory means to repeatedly record said digital data on the track when said detecting means detects that said digital data is not written in the whole of said memory means, that said data block can be recorded coextensively with one scan of said rotary head.

2. Apparatus according to claim 1, wherein said memory means comprises a pair of memory banks each having such a capacity that said data block can be recorded, said pair of memory banks being alternately used for writing and reading said digital data.

3. Apparatus according to claim 1, wherein said detecting means generates a signal indicating said amount of digital signal and said data is recorded on said track together with said digital data.

4. Apparatus according to claim 1, further comprising auxiliary memory means interconnected with said memory means for transferring said digital data between said memory means and an external device.

5. Apparatus according to claim 4, wherein said auxiliary memory means has at least such a capacity as to store said digital data of sub-block, said data block being divided into a predetermined number of said sub-blocks.

* * * * *